US008433063B2

(12) United States Patent
Murano et al.

(10) Patent No.: US 8,433,063 B2
(45) Date of Patent: *Apr. 30, 2013

(54) HORIZONTAL COPPER PATCHING ASSEMBLY (75) Inventors: Adam Murano, Lebanon, CT (US); Chester H. Rynaski, Franklin, CT (US)

(73) Assignee: Ortronics, Inc., New London, CT (US)

( * ) Notice: Subject to any disclaimer, the term of this patent is extended or adjusted under 35 U.S.C. 154(b) by 1269 days.

This patent is subject to a terminal disclaimer.

(21) Appl. No.: 12/206,318

(22) Filed: Sep. 8, 2008

(65) Prior Publication Data
US 2010/0061064 A1 Mar. 11, 2010

(51) Int. Cl.
H04M 1/00 (2006.01)
G02B 6/00 (2006.01)
G01R 19/00 (2006.01)

(52) U.S. Cl.
USPC ............ 379/440; 62/51.1; 324/66; 340/10.1; 340/572.8; 361/725; 379/32.01; 379/413.02; 385/135; 726/4

(58) Field of Classification Search .................... 324/66; 340/10.1, 572.8; 361/725; 379/32.01, 413.02, 379/440; 385/135; 726/4; 62/51.1
See application file for complete search history.

(56) References Cited

U.S. PATENT DOCUMENTS

| 4,522,034 | A  | * | 6/1985  | Laskaris ................... 62/51.1 |
|-----------|----|---|---------|--------------------------------------|
| 6,351,592 | B1 | * | 2/2002  | Ehn et al. ................... 385/135 |
| 7,406,240 | B2 | * | 7/2008  | Murano ..................... 385/135 |
| 7,573,254 | B2 | * | 8/2009  | Cobb et al. ................. 324/66 |
| 7,605,707 | B2 | * | 10/2009 | German et al. ............ 340/572.8 |
| 7,697,811 | B2 | * | 4/2010  | Murano et al. ............. 385/135 |
| 8,116,434 | B2 | * | 2/2012  | German et al. ............ 379/32.01 |
| 2006/0153362 | A1 | * | 7/2006 | Bloodworth et al. ..... 379/413.02 |
| 2006/0153516 | A1 | * | 7/2006 | Napiorkowski et al. ...... 385/135 |
| 2009/0178119 | A1 | * | 7/2009 | Macauley .................... 726/4 |
| 2010/0052856 | A1 | * | 3/2010 | Macauley et al. ........... 340/10.1 |
| 2010/0061064 | A1 | * | 3/2010 | Murano et al. ............. 361/725 |
| 2010/0061691 | A1 | * | 3/2010 | Murano et al. ............. 385/135 |

OTHER PUBLICATIONS

Ortronics product literature, OptiMo High Performance Fiber Optic Solutions, Jun. 2005, 12 pages.
Ortronics product literature, OptiMo High Performance Fiber Optic Solutions, 2006, 12 pages.

* cited by examiner

Primary Examiner — Gerald Gauthier
(74) Attorney, Agent, or Firm — McCarter & English, LLP (57) ABSTRACT Assemblies and methods are provided for facilitating copper-wire patching. More particularly, the assemblies and methods involve mounting patch ports arranged along a horizontal plane (horizontally-aligned) with respect to a tray. The tray is movably mounted with respect to a cabinet enclosure, e.g., via a pivotal or translational (sliding) relationship, thereby providing easy access to the ports. The horizontally-aligned configuration advantageously increases patching density within a cabinet structure while maintaining port accessibility.

19 Claims, 11 Drawing Sheets

HORIZONTAL COPPER PATCHING ASSEMBLY

BACKGROUND

1. Technical Field

The present disclosure relates to assemblies and methods directed to patching assemblies and methods for use in patching of copper-based communication systems.

2. Background Art

Copper patching systems are often used to facilitate networking between switches, servers, storage devices, etc. Patching systems permit users to establish temporary and/or easily modified electrical connections between communication channels, thereby permitting rapid and efficient reconfigurations and/or modifications to network connections in a central location. As shown in the Telecommunication Industry of America (TIA) Standard for data centers, TIA-942, a patch panel interface frequently exists as an integral part of a building's architecture. Due to the relatively large space that data centers can occupy, it is recommended that building architects plan for data center and telecommunication room accommodations early in a design process.

To reduce the effective area that a patching system utilizes in a facility, suppliers of patching cables and interface apparatus have taken steps to reduce the jack size and, thus, increase patching density. As is known to persons skilled in the art, the term "jack" is generally interchangeable with the terms "port," "adapter" and "coupler", and refers to a device/component that creates a physical interface with a properly configured plug (also herein referred to as a "connector"), e.g., RJ11 telephone connector, 8P8C Ethernet connector, etc. A jack typically contains features that facilitate detachably latching a plug with respect to a jack.

Suppliers of copper-wire connectivity hardware have recently been providing modular cassette patching products to the premise industry. These cassette systems allow the user to create a passive network link with minimal patching experience. A user can install the cassette into a vertical rack cabinet, such as the Ortronics FC02U-P (Ortronics, Inc.; New London, Conn.), connect a backbone cable to the rear of the cassette, and then connect a patch cord from the front of the cassette, e.g., to a transceiver. The backbone cable is similarly connected, e.g., via a jack to a second transceiver, thereby creating a data link.

Figure 1:
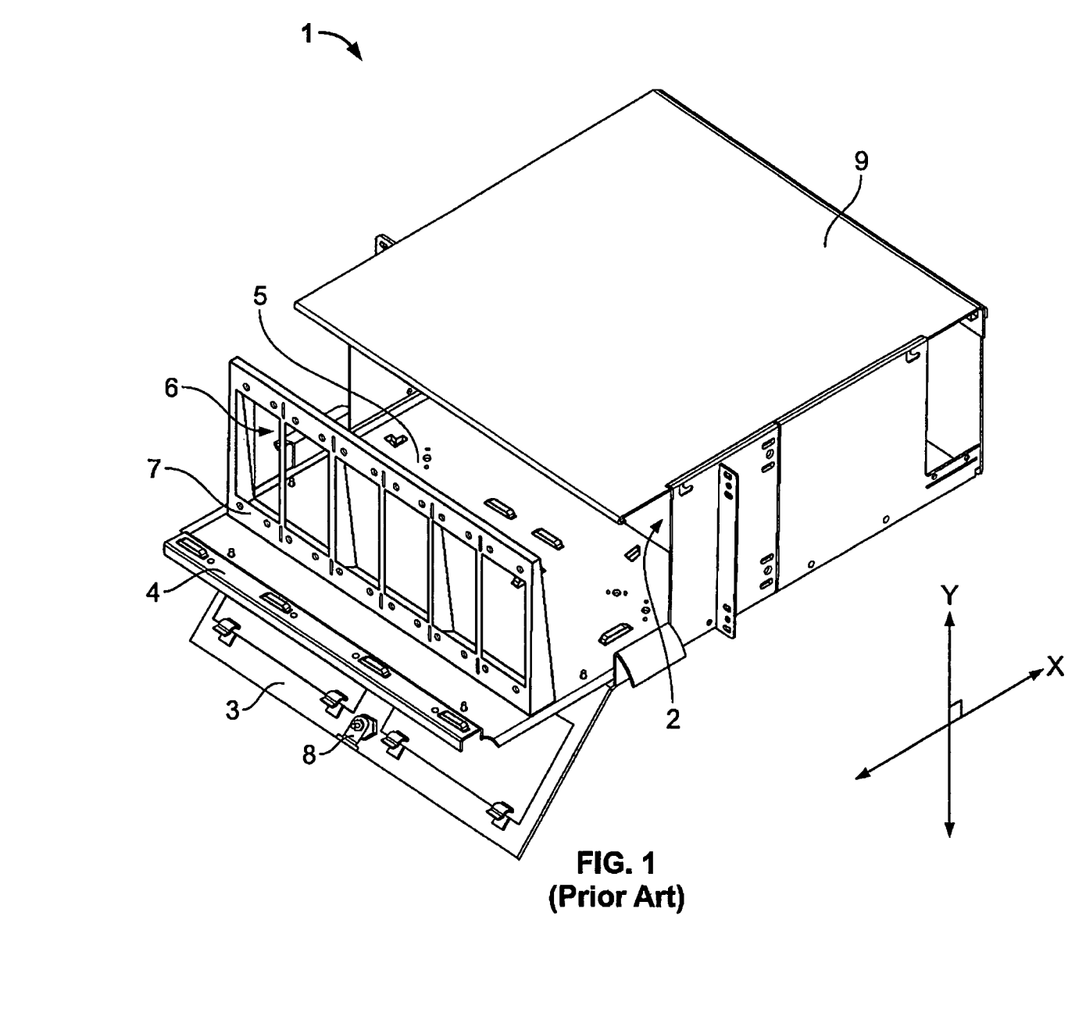
FIG. 1 is a perspective view of an exemplary prior art vertically-aligned patching assembly.

To date, rack systems and cassettes are designed for vertical stacking. FIG. 1 illustrates an exemplary embodiment of a vertical stacking cassette cabinet assembly 1 associated with prior art assemblies. Assembly 1 includes an enclosure 9 defining a receiving cavity 2. Tray 14 is adapted to host a plurality of copper-wire ports (not shown) (not shown). The ports are often included on a cassette shell (not shown) that can be secured on a bottom tray surface 5. For patching purposes, the ports are accessed through openings 6 defined along a front face 7 extending upwardly with respect to tray 4.

In conventional designs, tray 4 translates axially along a horizontal axis "x" by sliding motion of tray 14 with respect to cavity 2. Rear patching access to the cassettes is generally achieved by sliding tray 4 out from cavity 2. When tray 4 is fully inserted within cavity 2, cabinet 9 can be closed via a hingedly connected front door 3 which can include a locking feature 8 for securely locking cabinet 9 and preventing unauthorized access to the cassettes.

According to the prior art assemblies, the cassettes hosted on bottom surface 5 align the plurality of ports vertically along axis "y". This configuration disadvantageously prevents further use in the deeper portions associated with cavity 2. Since the port is limited by this inefficient use of space, a relatively large number of cabinets is often necessary to accommodate the patching needs of data centers.

Conventional vertical stacking techniques allow for the user to easily insert and remove patch cords from the patch panel as well as manage the copper-wiring in vertical cable managers. Historically, only the vertical plane of the rack has been used/available for patching access. However, a need exists to further increase the connection density for copper-wire patching systems and, thereby, advantageously maximize the efficient use of a given (and often times limited) floor space in a data center or telecommunications room. These and other needs are addressed by the assemblies and methods of the present disclosure,

SUMMARY

The present disclosure relates to assemblies and methods for facilitating patching of copper wire systems. More particularly, the present disclosure relates to assemblies and methods that involve and/or utilize patch ports for copper wire connections that are arranged along a horizontal plane (horizontally-aligned) with respect to a tray. The patch ports may be advantageously mounted with respect one or both sides of the tray. The disclosed tray is advantageously movably mounted with respect to a cabinet enclosure. Thus, in exemplary embodiments, the disclosed tray may pivot and/or slide in/out relative to the cabinet enclosure, e.g. via one or more doors/openings in one or more sides of the cabinet enclosure. The present disclosure, however is not limited to embodiments that employ sliding and/or pivoting mechanisms, but extends to all tray designs, provided that the tray supports horizontally-aligned patch ports and is movably mounted with respect to the cabinet enclosure. In exemplary embodiments, the cabinet enclosure is adapted to receive a plurality of trays. Thus, a typical cabinet enclosure associated with the present disclosure may be customized for a desired network.

Furthermore, in exemplary embodiments, the ports are organized and deployed in defined structures and/or defined configurations, e.g., cassette organizations/arrangements. Such port deployments advantageously facilitate mounting of the ports relative to the tray and promote overall cable/system management. In exemplary embodiments, cassette organizations/arrangements are employed in order to effect plug-and-go capabilities. Thus, in exemplary embodiments of the present disclosure, a patching assembly may include a plurality of cassettes mounted relative to the tray such that the ports are arrayed in a substantially horizontal relationship. The cassettes may be removably/interchangeably installed relative to the tray.

The presently disclosed patching assemblies and methods present many advantages relative to prior art designs and systems. For example, horizontal deployment of the disclosed ports advantageously increases patching density within a cabinet structure while maintaining port accessibility.

Additional features, functions and benefits of the disclosed assemblies and methods will be apparent from the description which follows, particularly when read in conjunction with the appended figures.

BRIEF DESCRIPTION OF THE DRAWINGS

To assist those of ordinary skill in the art in making and using the disclosed assemblies and methods, reference is made to the appended figures, wherein.

DESCRIPTION OF EXEMPLARY EMBODIMENT(S)

According to the present disclosure, advantageous assemblies and methods are provided for facilitating copper patching. More particularly, the disclosed assemblies and methods generally involve mounting patch ports in a horizontal plane (horizontally-aligned) with respect to a tray. The disclosed tray is movably positioned with respect to a cabinet enclosure, e.g., via a pivotal or translational (sliding) relationship, thereby providing easy access to the ports. Thus, the horizontally-aligned configuration advantageously increases patching density within a cabinet structure while maintaining port accessibility. In exemplary embodiments, the ports are organized in defined structures/configurations, e.g., cassette casings (with or without plug-and-go capabilities). Such port configurations advantageously facilitate mounting of the ports relative to the tray and promote cable/system management.

Figure 2:
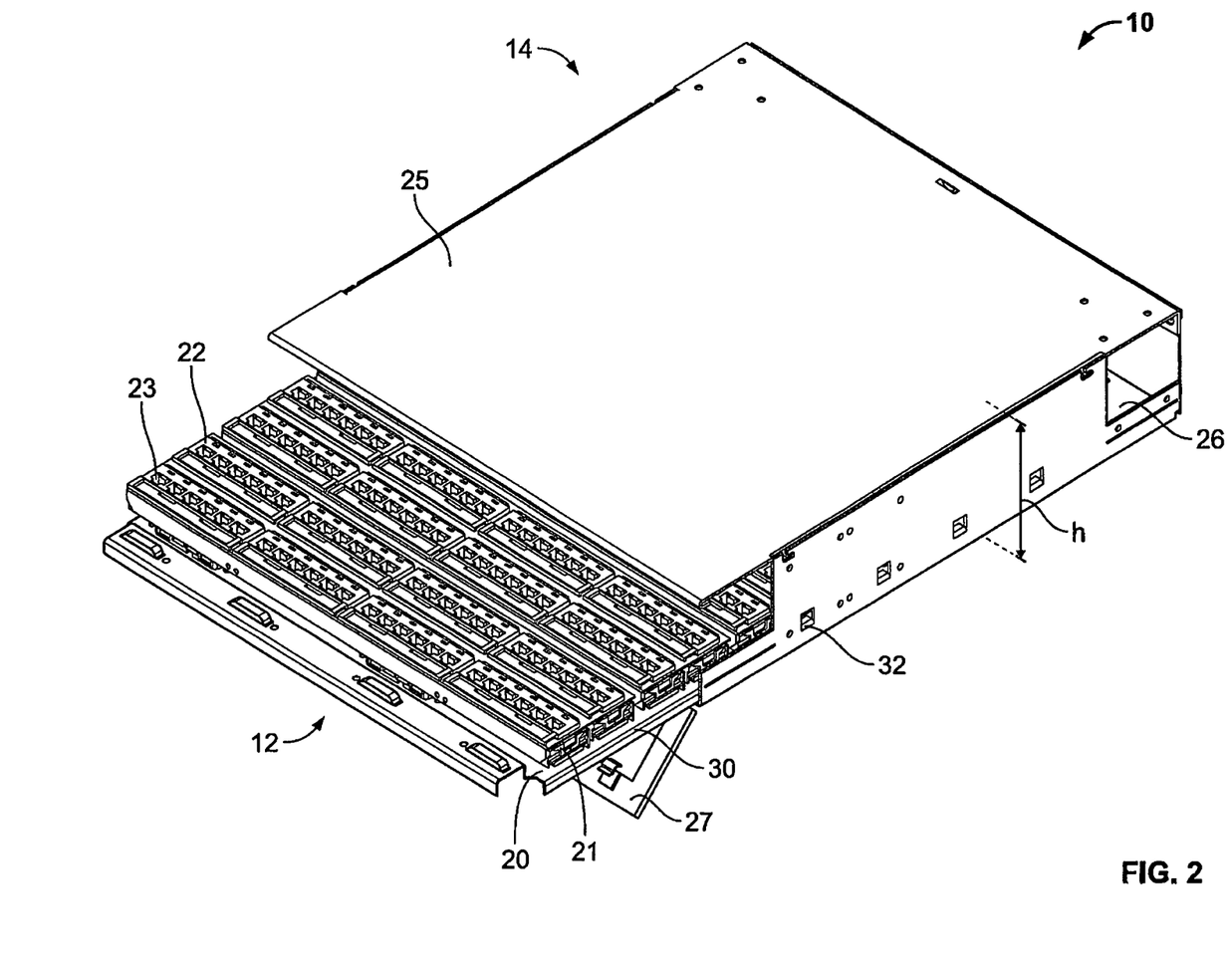
FIGS. 2 and 3 are perspective views of an exemplary horizontally-aligned copper wire patching assembly, wherein a tray including copper-wire ports is movably positioned with respect to a cabinet enclosure via a translational relationship.
Figure 3:
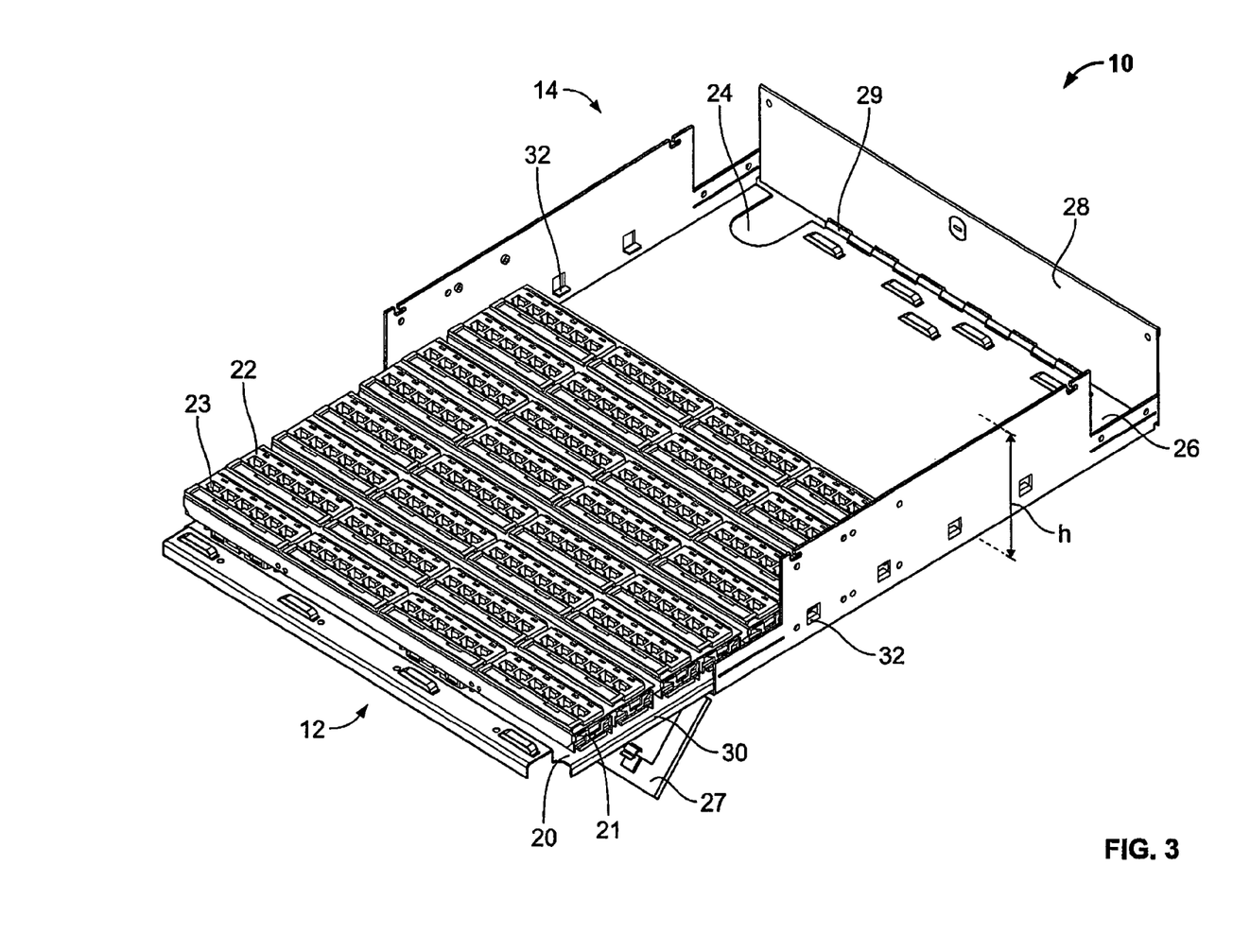

With initial reference to FIGS. 2-3, exemplary embodiments of a horizontally-aligned copper patching system 10 are depicted. Generally, the patching system 10 includes a tray 12 and a cabinet enclosure 14. The tray 12 is movably mounted with respect to the cabinet enclosure 14. In the exemplary embodiments depicted in FIGS. 2-3, the tray 12 is mounted for translational motion relative to the cabinet enclosure 14 by means of at least one sliding mechanism. Thus, the illustrative sliding mechanism depicted in FIGS. 2-3 includes grooved sliding tracks 30 and inwardly directed tabs 32 that cooperate with the grooved sliding tracks 30 for sliding engagement therebetween. The disclosed sliding mechanism facilitates access to the tray 12, such that the tray 12 can slide in/out of the cabinet enclosure 14, e.g., with respect to the grooved sliding tracks 30.

The disclosed cabinet enclosure 14, generally includes a front access door 27. In exemplary embodiments, e.g., as depicted in FIG. 3, a rear access door 28 may be included to advantageously increase the accessibility of the tray 12. The front and rear access doors 27 and 28, respectively, are typically hingedly attached relative to the base of the cabinet enclosure 26, e.g., by means of hinges 29. Cabinet enclosure 14 may also include a top 25. Typically, the cabinet enclosure 14 is configured and dimensioned for housing within a cable management rack, e.g., the Mighty Mo® 6 rack available from Ortronics, Inc. (New London, Conn.).

In exemplary embodiments, the height "h" of the cabinet enclosure 14 is optimally minimized, e.g., in order to conserve rack space. The minimum height of the cabinet enclosure 14 is effectively determined by the "overhead" cabinet enclosure space needed for patching operations. In exemplary embodiments, height "h" is typically a distance that is greater than or equal to about 0.5 inches. In further exemplary embodiments, height "h" is between about 0.5 inches and about 4 inches.

Generally, the tray 12 includes a tray surface 20 and a plurality of patching ports (also referred to as adapters) 23 mounted relative to the tray surface 20. The plurality of ports 23 are generally aligned and configured along a horizontal plane, thus advantageously increasing the patching density of the system over prior art designs/systems. Each port 23 is typically adapted to receive a copper-wire connector/plug of a patch cord (not depicted). The patch cords are generally flexible in order to allow for patching between the ports 23 and/or with external systems. In exemplary embodiments, the patch cords are contained within a space above the patching plane that measures about ½ to 1 Rack Mounting Unit (1 rmu=1.75").

In exemplary embodiments, the ports 23 are angled (not depicted) toward the front of the patching system, advantageously facilitating patching operations. Angling the ports 23 minimizes the "overhead" cabinet enclosure space necessary, thereby promoting a more efficient use of space. Angling the ports 23 also minimizes the risk of "over-bending" the patch cords and facilitates access to the ports 23, e.g., via the front access door 27.

In exemplary embodiments, the ports 23 may be configured/structured in cassette casings 22, e.g., to promote plug-and-go capabilities and/or facilitate cable management. The cassette casings 22 may include a latching mechanism 21 to facilitate mounting/attaching the ports 23 relative to the tray surface 20. Of note, the organizational configurations, e.g., of the ports 23, cassette casing 22, latching mechanism 21, etc., as depicted in FIGS. 2-3 are not limiting, but merely illustrative. Indeed, these and other configurations may advantageously be adopted depending on the particular needs and constraints of the desired patching system.

One advantage associated with using cassette casings 22 relates to cord management. Thus, the cassette casing 22 may include one or more backbone cables (not depicted) for connecting with and/or facilitating communications with external and/or surrounding systems/equipment. In exemplary embodiments, the one or more backbone cables extend from the cassette casings 22 and out of the cabinet enclosure 14 by means of an opening 24 defined through the base of the cabinet enclosure 26. The cables are selected so as to provide sufficient slack to allow the tray 12 to slide in/out of the cabinet enclosure 14 in an unobstructed manner.

Figure 4:
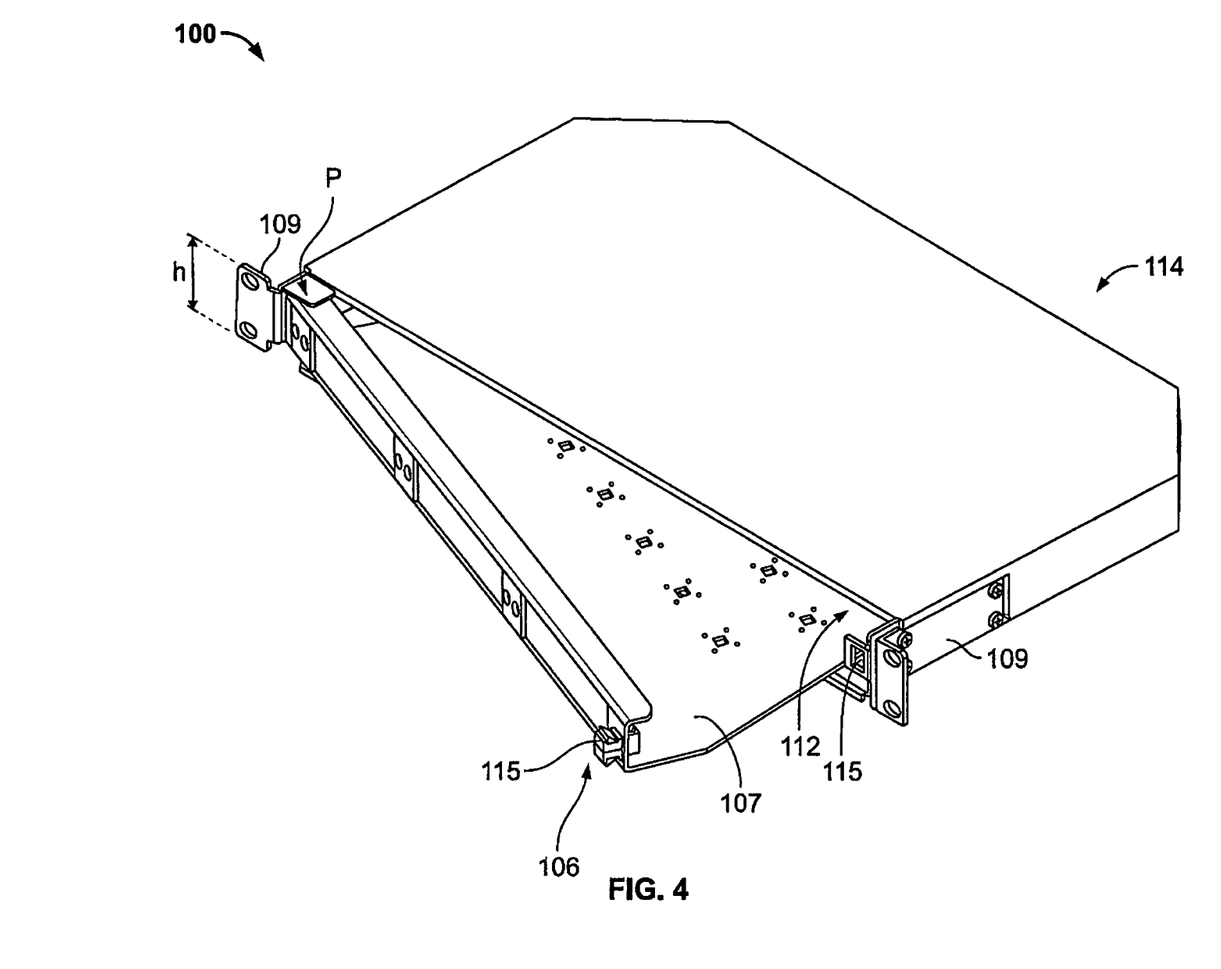
FIG. 4 is a perspective view of an exemplary horizontally-aligned copper wire patching assembly, wherein an exemplary tray (copper wire ports not depicted) is movably positioned with respect to a cabinet enclosure via a pivotal relationship.
Figure 5:
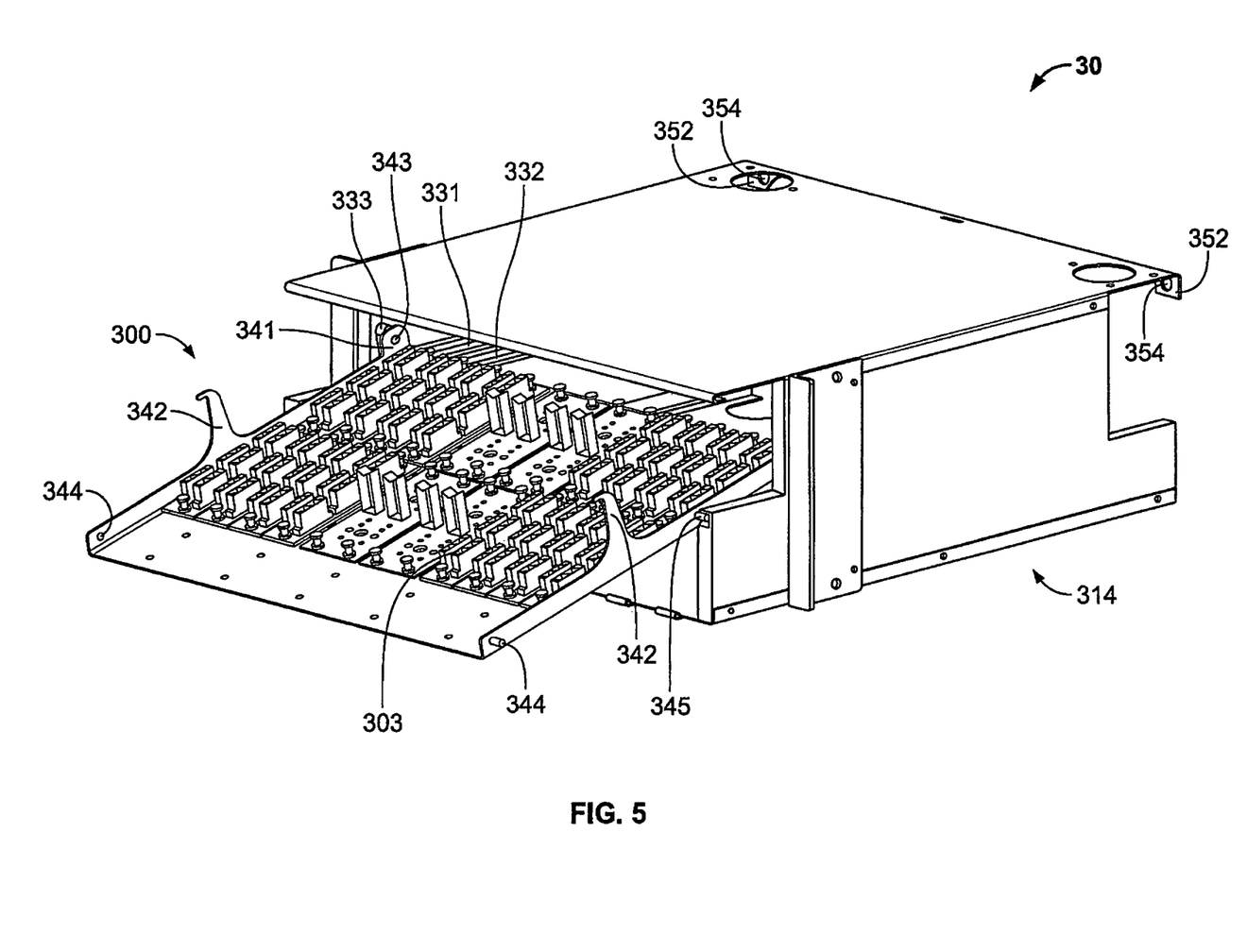
FIG. 5-11 depict an alternative exemplary horizontally-aligned copper wire patching assembly, wherein a tray includes copper-wire ports mounted relative to both the top and bottom faces of the tray and is movably positioned with respect to a cabinet enclosure via a translational relationship.

With reference now to FIG. 4, an alternative exemplary horizontally-aligned copper-wire patching assembly 100 is depicted. The patching assembly 100 includes a cabinet enclosure 114 and a tray 106, wherein the tray 106 includes a plurality of patching ports (not depicted) mounted relative to the tray surface 107 and configured along a horizontal plane. In general, the cabinet enclosure 114 defines a receiving cavity 112 within which the tray 106 is movably positioned. As depicted in FIG. 5, the tray 106 is pivotally attached to the cabinet enclosure 114 at a pivot point "P" by means of a pivot feature. Thus, the tray 106 pivots out of the cabinet enclosure for easy port access. In exemplary embodiments of the present disclosure, the tray 106 may also include a locking feature 115. The locking feature 115 allows for securing the tray 106 within a cabinet enclosure 114 to prevent unauthorized access.

Typically, the cabinet enclosure 114 is configured and dimensioned for housing within a cable management rack, e.g., the Mighty Mo® 6 rack available from Ortronics, Inc. (New London, Conn.). Thus, as previously discussed, the height "h" of the cabinet enclosure 114 is optimally minimized, e.g., in order to conserve rack space. In exemplary embodiments, the patching assembly 100 may also include a pair of mounting brackets 109 to facilitate mounting the patching assembly 100 relative to a desired location, e.g., with respect to a cable management rack. To this end, the mounting brackets 109 may define mounting bracket holes adapted to receive mounting features such as screws, bolts, nails, etc.

With reference now to FIGS. 5-11, exemplary embodiments of a horizontally-aligned copper-wire patching assembly 30 are depicted. Generally, the patching assembly 30 includes a tray 300, and a cabinet enclosure 314. In the exemplary embodiments depicted in FIGS. 5-11, the tray 300 includes a plurality of copper-wire patch ports 303 mounted relative to both the top and bottom faces of the tray 300. Thus, patching density is advantageously increased. Access to the top and bottom faces is advantageously facilitated by tilting the tray 300 as later discussed herein.

In the exemplary embodiments depicted, the tray 300 is movably positioned within the cabinet enclosure 314 via a translational relationship. As previously discussed, the tray 300 may be translationally related relative to the cabinet enclosure 314 by means of one or more grooved sliding tracks e.g., sliding tracks 331 and 332. In the exemplary embodiments depicted in FIGS. 5-11, the cabinet enclosure 314 includes a top sliding track 331 and a bottom sliding track 332. The tray 300 includes front pins 344 and middle pins 345 which are configured to slide along the bottom sliding track 332 and rear pins 343 which are configured to slide along the top sliding track 331. The tray 300 may also include rear flanges 341 for elevating the rear pins 343 into proper alignment with the top sliding track 331, thus leveling the tray 300 when positioned within the cabinet enclosure (see FIGS. -7-8). The patching assembly 30 is configured such that tray 300 is accessible via either the front side (see FIGS. 5-6) or the back side (see FIGS. 9-11) of the cabinet enclosure 314. Furthermore, the top and bottom sliding tracks 331 and 332 are advantageously configured such that the tray 300 may be tilted up or down, thus facilitating access to either face of the tray 300.

Figure 6:
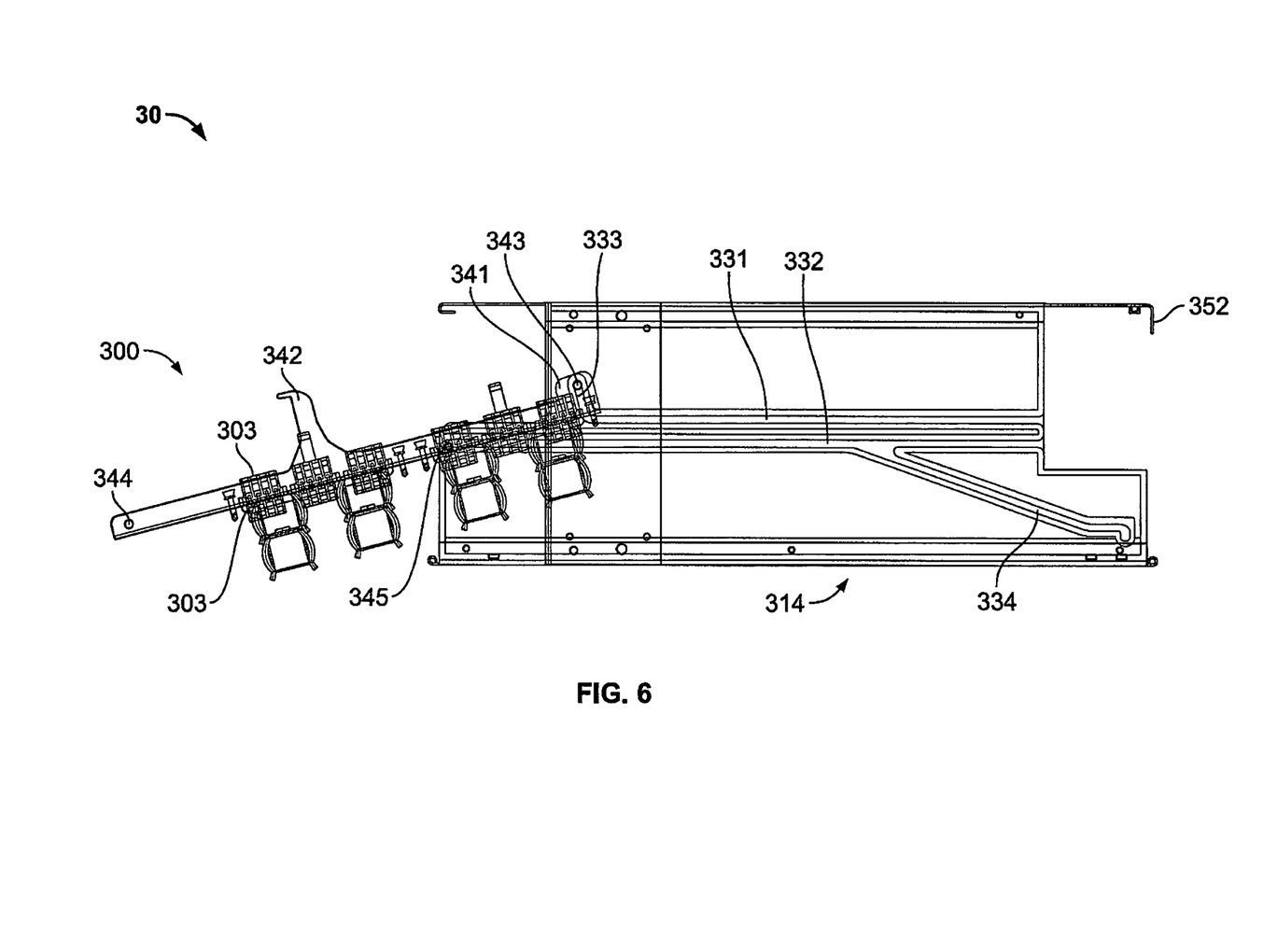
Figure 7:
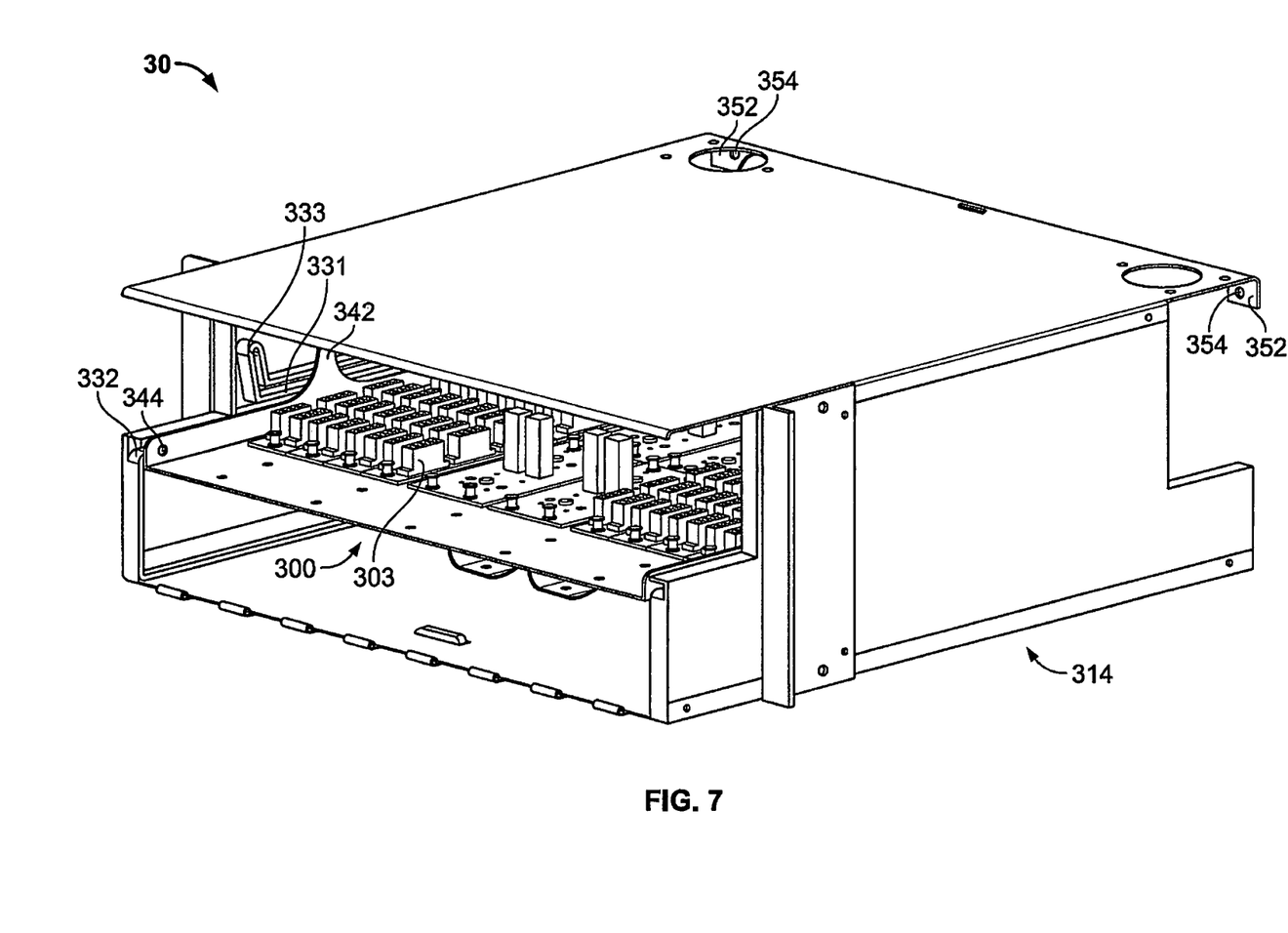
Figure 8:
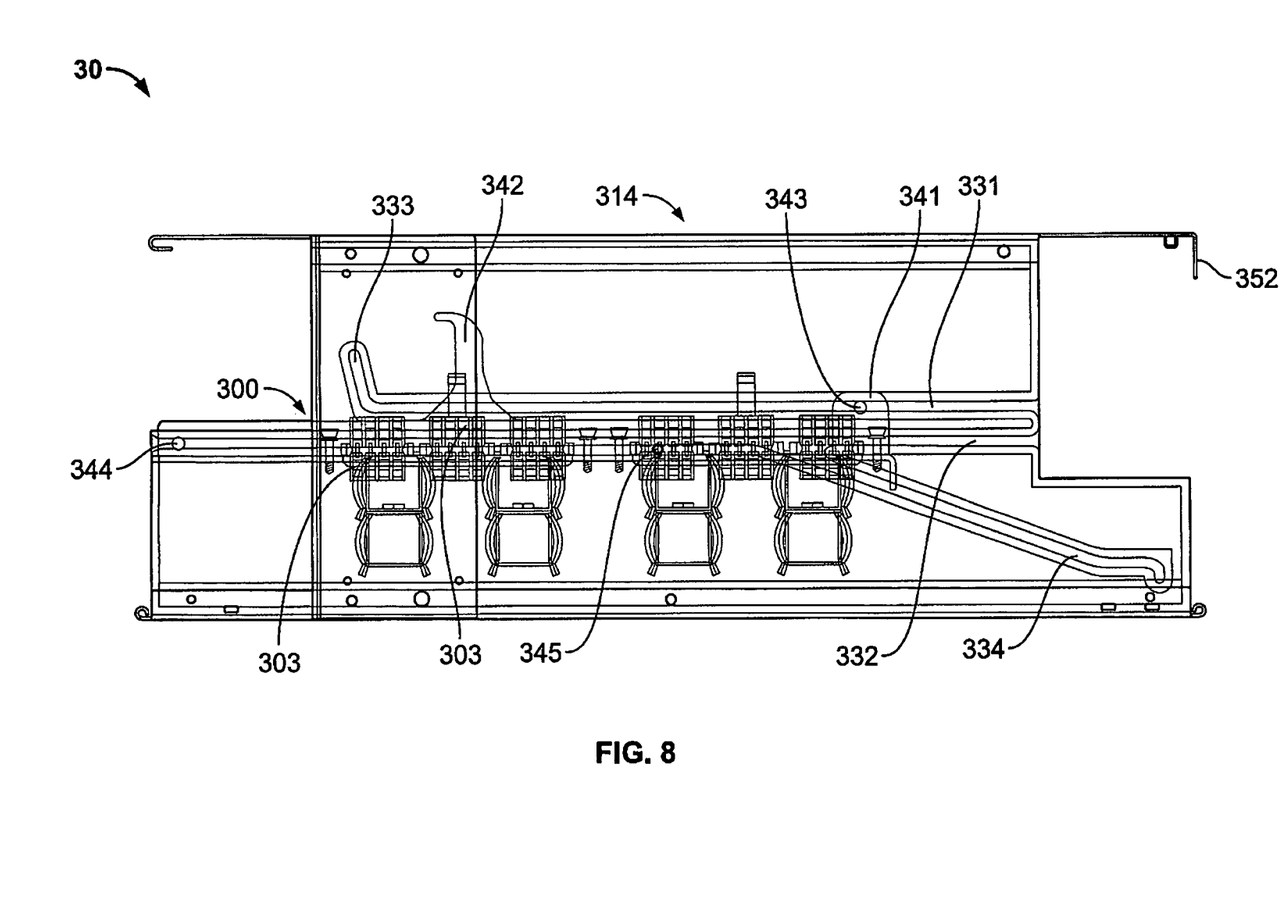
Figure 9:
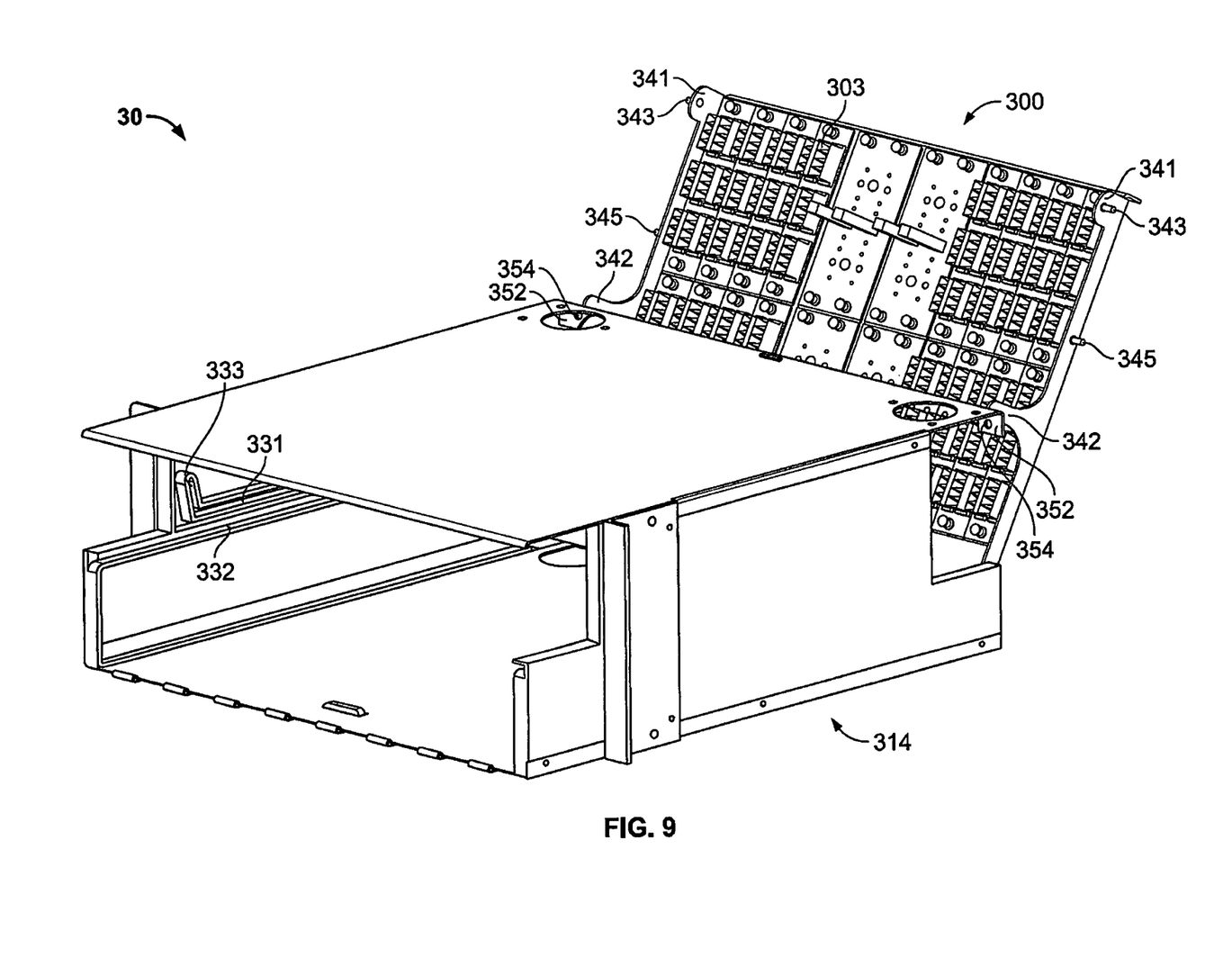
Figure 10:
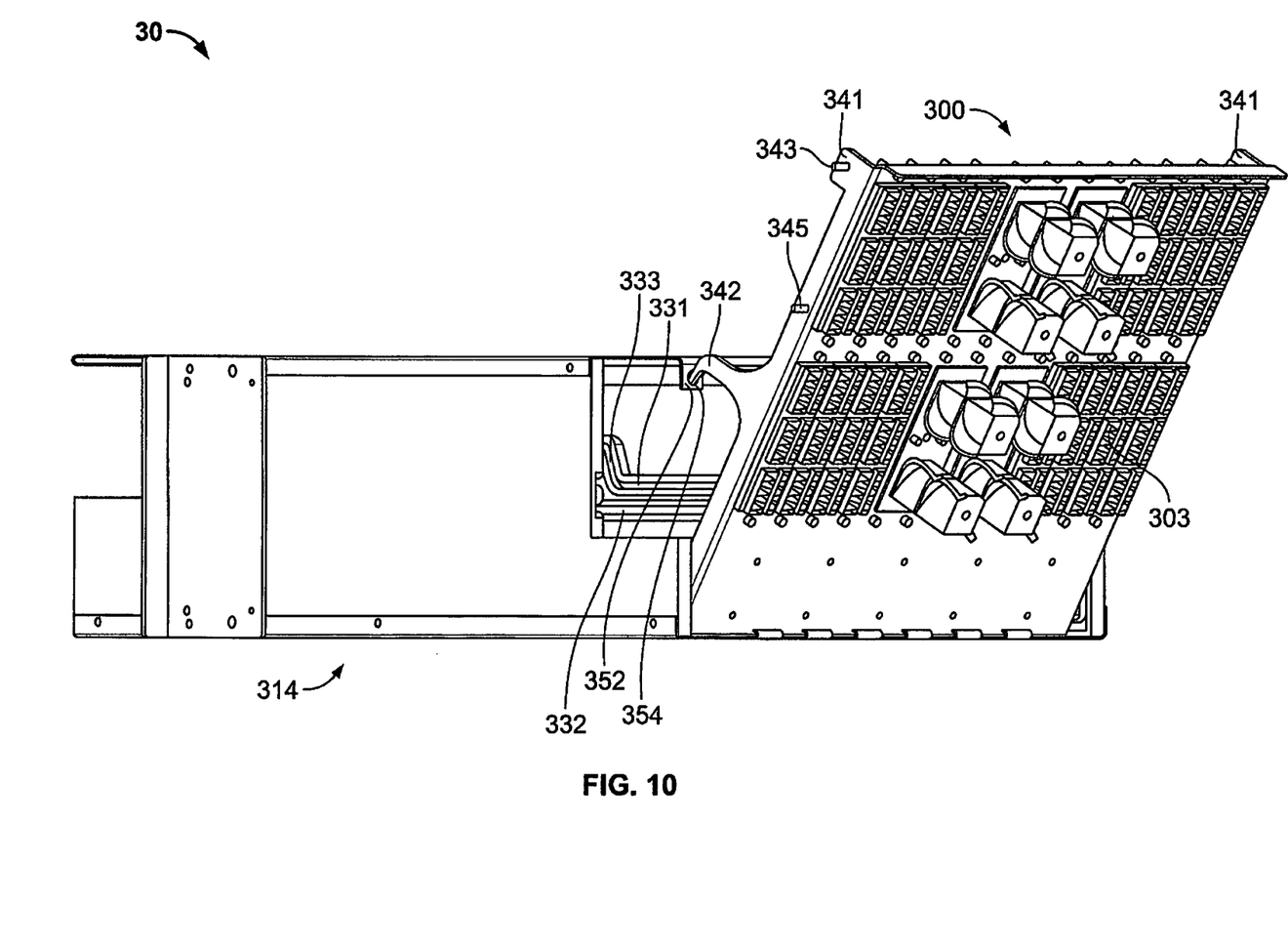
Figure 11:
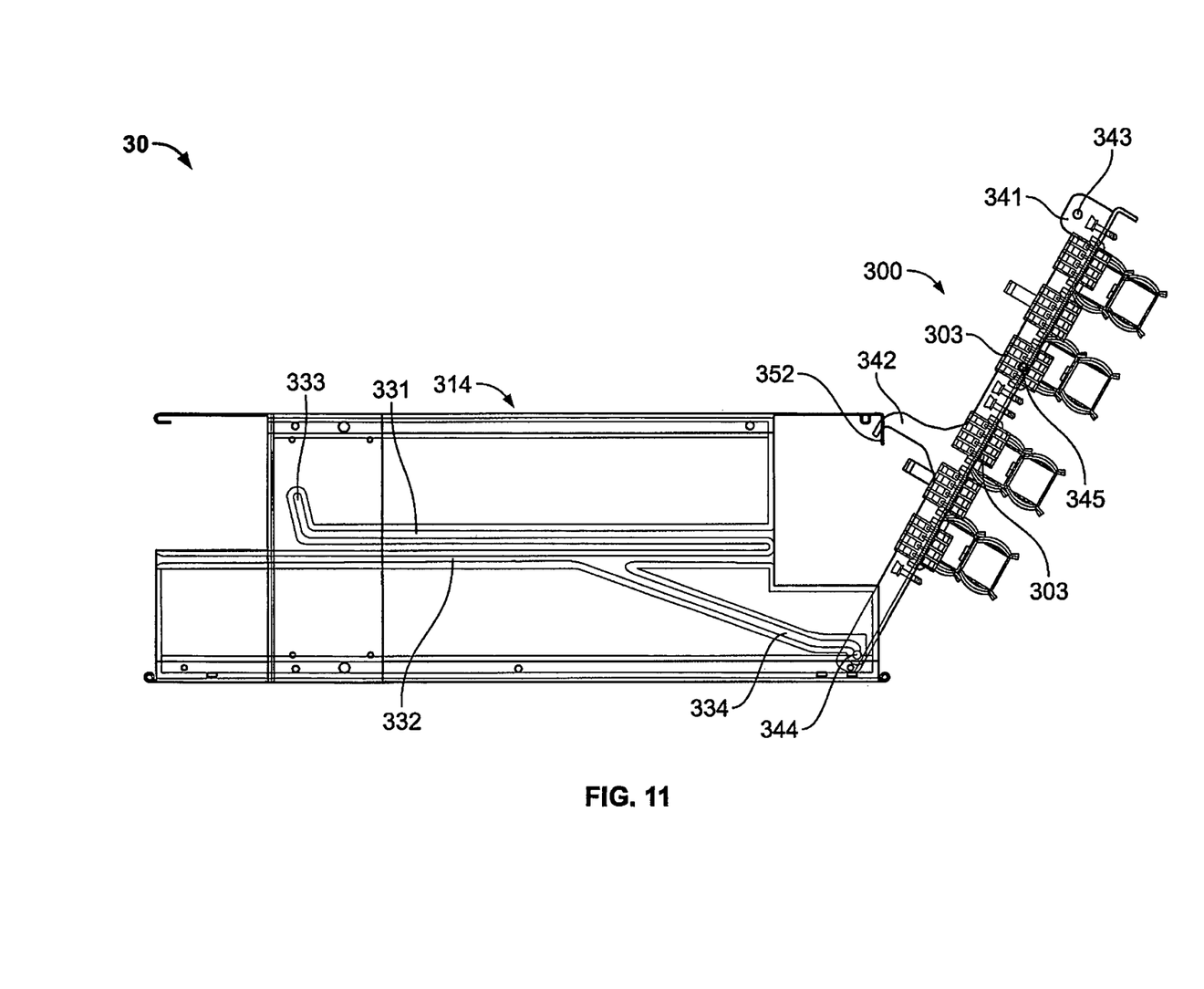

With particular reference to FIGS. 5-6, frontal access of the tray 300 is depicted. The tray 300 is tilted down, thus facilitating access to the top face of the tray 300. The tilting of the tray 300 is effected by a rising portion 333 of the top sliding track 331. The rising portion 333 of the top sliding track 331 elevates the back of the tray 300, thus tilting the tray relative to a pivot axis defined by the middle pins 345. Since the pivot axis is set back slightly from the center of mass of the tray 200, the tray tilts downwards as it is removed from within the cabinet enclosure 314 and levels as it is replaced within the cabinet enclosure 314.

With particular reference to FIGS. 8-11, rear access to the tray 300 is depicted. The tray 300 is tilted up, thus facilitating access to the bottom face of the tray 300. The tilting of the tray 300 is effected by a descending portion 334 of the bottom sliding track 332. The descending portion 334 of the bottom sliding track 332 allows the back of the tray 300 to drop. The tray 300 may then be manually tilted upwards relative to a pivot axis defined by the front pins 344. The tray 300 may be secured in an upward tilted position by means of fasteners 342. In exemplary embodiments, the fasteners 342 include a hooked tip which latches relative to openings 354 defined in latching flanges 352 along the rear of the cabinet enclosure 314.

Although the present disclosure has been described with reference to exemplary embodiments and implementations thereof the disclosed assemblies and methods are not limited to such exemplary embodiments/implementations. Rather, as will be readily apparent to persons skilled in the art from the description provided herein, the disclosed assemblies and methods are susceptible to modifications, alterations and enhancements without departing from the spirit or scope of the present disclosure. Accordingly, the present disclosure expressly encompasses such modification, alterations and enhancements within the scope hereof.

What is claimed:

1. A patching assembly, comprising:
   (a) a cabinet enclosure defining a receiving cavity;
   (b) a tray movably mounted with respect to the receiving cavity of the cabinet enclosure;
   (c) a plurality of copper wire ports mounted in a horizontal plane relative to the tray.

2. The patching assembly according to claim 1, wherein the plurality of copper wire ports are aligned in horizontal rows.

3. The patching assembly according to claim 1, wherein the plurality of copper wire ports are mounted with respect to cassette casings that are in turn mounted with respect to the tray.

4. The patching assembly according to claim 3, wherein the cassette casings are associated with one or more backbone cables.

5. The patching assembly according to claim 3, wherein the cassette casings include a latching mechanism.

6. The patching assembly according to claim 1, wherein the plurality of copper wire ports are angled toward the front of the tray.

7. The patching assembly according to claim 1, wherein the tray is either pivotally or translationally mounted with respect to the cabinet enclosure.

8. The patching assembly according to claim 1, wherein the assembly includes a pivot feature for pivotally attaching the tray relative to the cabinet enclosure.

9. The patching assembly according to claim 1, further comprising at least one sliding mechanism to facilitate translational motion between the tray and the cabinet enclosure.

10. The patching assembly according to claim 9, wherein the at least one sliding mechanism includes one or more sliding tracks.

11. The patching assembly according to claim 10, wherein the cabinet enclosure includes a top sliding track and a bottom sliding track, and wherein the top sliding track and the bottom sliding track facilitate tilting of the patch tray upon movement from within the cabinet enclosure.

12. The patching assembly according to claim 1, wherein the plurality of copper-wire ports are mounted relative to one of: (i) the top face of the patch tray, (ii) the bottom face of the patch tray, and (iii) both the top and the bottom faces of the patch tray.

13. The patching assembly according to claim 1, wherein the tray may be tilted up or down upon movement from within the cabinet enclosure.

14. The patching assembly according to claim 1, wherein the tray is accessible from one or more sides of the cabinet enclosure.

15. The patching assembly according to claim 1, wherein the cabinet enclosure further includes a locking feature for securing access to the tray.

16. The patching assembly according to claim 1, wherein the cabinet enclosure includes a top cover.

17. The patching assembly according to claim 1, wherein the overhead height of the cabinet enclosure is sufficient to allow for patching operations therewithin.

18. A method for configuring copper wire patch ports comprising the steps of:
- (a) mounting a plurality of copper-wire ports in a horizontal plane with respect to a tray; and
- (b) movably mounting the tray with respect to a cabinet enclosure.

19. The method according to claim 18, wherein the tray is either pivotally or translationally mounted with respect to the cabinet enclosure.

\* \* \* \* \*